Figure 1:
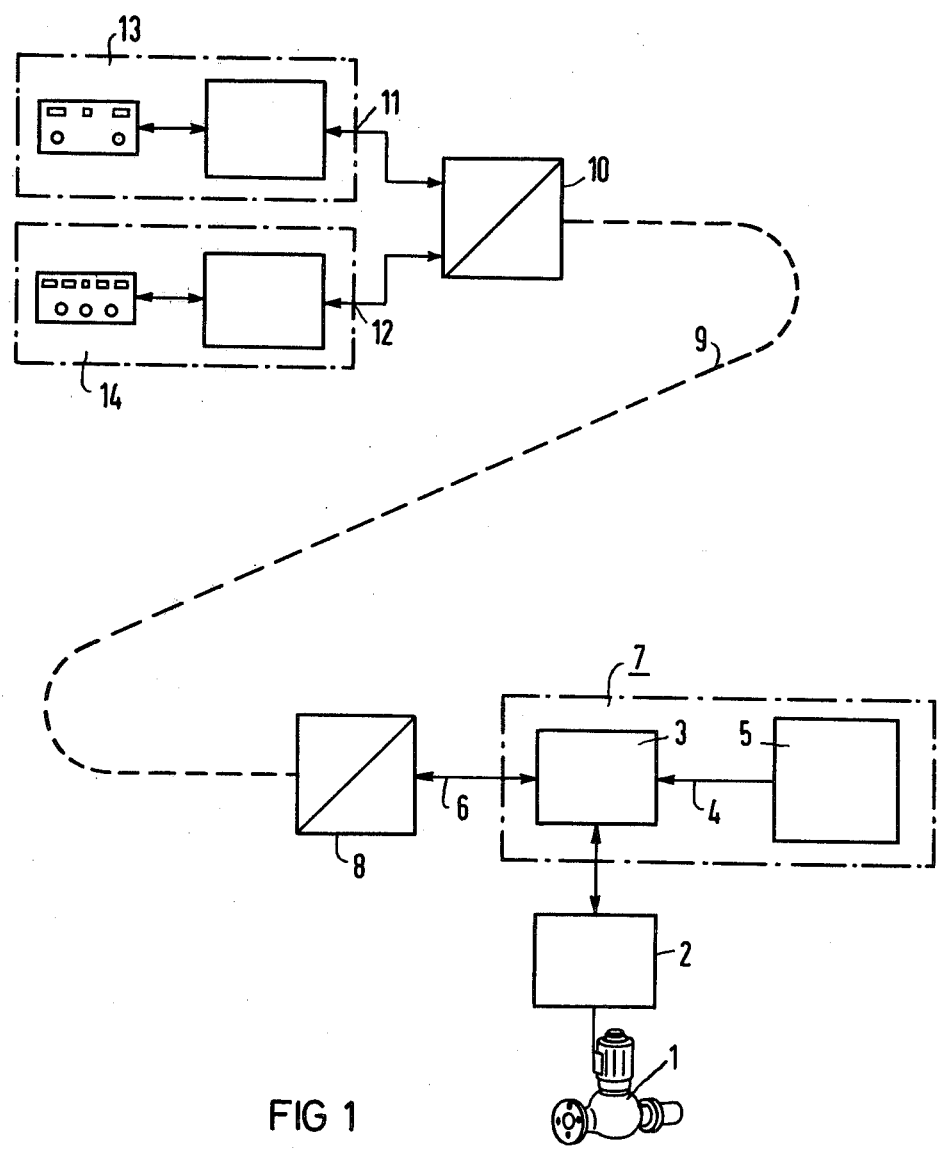

United States Patent [19]

Hofmann et al.

[11] 4,443,710

[45] Apr. 17, 1984

[54] CONTROL AND MONITORING DEVICE FOR INFLUENCING SAFETY-RELEVANT SYSTEM PARTS OF A POWER PLANT

[75] Inventors: Horst Hofmann, Bubenreuth; Karl-Heinz Lochner, Röttenbach, both of Fed. Rep. of Germany

[73] Assignee: Kraftwerk Union Aktiengesellschaft, Mülheim, Fed. Rep. of Germany

[21] Appl. No.: 253,905

[22] Filed: Apr. 14, 1981

[30] Foreign Application Priority Data

Apr. 15, 1980 [DE] Fed. Rep. of Germany ....... 3014421

[51] Int. Cl.³ .......................... H02J 1/00; G02F 1/28
[52] U.S. Cl. ...................................... 307/80; 333/24.3
[58] Field of Search .................... 307/80, 65; 350/330; 333/24.3, 24 R

[56] References Cited

U.S. PATENT DOCUMENTS 3,429,637  2/1969  Wentz ............................ 333/24.3 X
3,444,483  5/1969  Schulz-Du Bois ........... 333/24 R X
4,096,394  6/1978  Ullmann et al. ................... 307/65 X

FOREIGN PATENT DOCUMENTS 2316432 10/1973 Fed. Rep. of Germany .

OTHER PUBLICATIONS

Control Engineering, S. J. Bailey, Mar. 1976, pp. 32 to 36.
Signal Transmission: Plenty of Electronic and Optical Options.

Primary Examiner—Donald A. Griffin
Attorney, Agent, or Firm—Herbert L. Lerner; Laurence A. Greenberg

[57] ABSTRACT

Control and monitoring devices for influencing safety-relevant system parts in a power station, including at least two rooms being separated from each other, similar electric circuits disposed in each of the rooms for at least one of giving commands and receiving acknowledgements for influencing a system part, a power supply being disposed in each of the rooms and being completely electrically separate from each other, electro-optical converters for transmitting signals being disposed in each of the rooms, and optical waveguide cables connecting the converters to each other.

2 Claims, 2 Drawing Figures

CONTROL AND MONITORING DEVICE FOR INFLUENCING SAFETY-RELEVANT SYSTEM PARTS OF A POWER PLANT

The invention relates to a control and monitoring device for influencing safety-relevant system parts (valves, switches, controls) in a power station in which several mutually redundant electric circuits for influencing a system part are provided for giving commands and/or receiving acknowledgements.

Through the use of mutually redundant circuits for controlling an individual system part, improved safety in addressing this part can be achieved by the provision that in the event of a failure of one of these circuits, the remaining circuits still ensure the operation of the system part. In such devices, however, a substantial reduction of the failure probability can be expected only if it is assured that a fault in one of these circuit does not spread to the other circuits. For this reason, one endeavors to construct redundant circuits in such a manner that they are decoupled from each other as far as possible.

It is accordingly an object of the invention to provide a control and monitoring device for influencing safety-relevant parts of a power plant, which overcomes the hereinafore-mentioned disadvantages of the heretofore-known devices of this general type, and to do so in a particularly far-reaching manner for decoupling such electric circuits from each other. In power plants, it may be expected in some circumstances for high voltages to be coupled into an electronic circuit which can cause scorching of insulation or a fire. It is also to be achieved by the invention that in the event of such extreme disturbances, no influencing of circuits which are constructed to be redundant with respect to each other can occur.

With the foregoing and other objects in view there is provided, in accordance with the invention, control and monitoring devices for influencing safety-relevant system parts in a power station, comprising at least two rooms being separated from each other, similar electric circuits disposed in each of the rooms for at least one of giving commands and receiving acknowledgements for influencing a system part, a power supply being disposed in each of the rooms and being completely electrically separated from each other, electro-optical converters for transmitting signals being disposed in each of the rooms, and optical wave guide cables connecting the converters to each other.

In accordance with a concomitant feature of the invention, there are provided means for protecting at least one of the rooms from earthquakes and crashing airplanes.

Other features which are considered as characteristic for the invention are set forth in the appended claims.

Although the invention is illustrated and described herein as embodied in a control and monitoring device for influencing safety-relevant system parts of a power plant, it is nevertheless not intended to be limited to the details shown, since various modifications and structural changes may be made therein without departing from the spirit of the invention and within the scope and range of equivalents of the claims.

Figure 2:
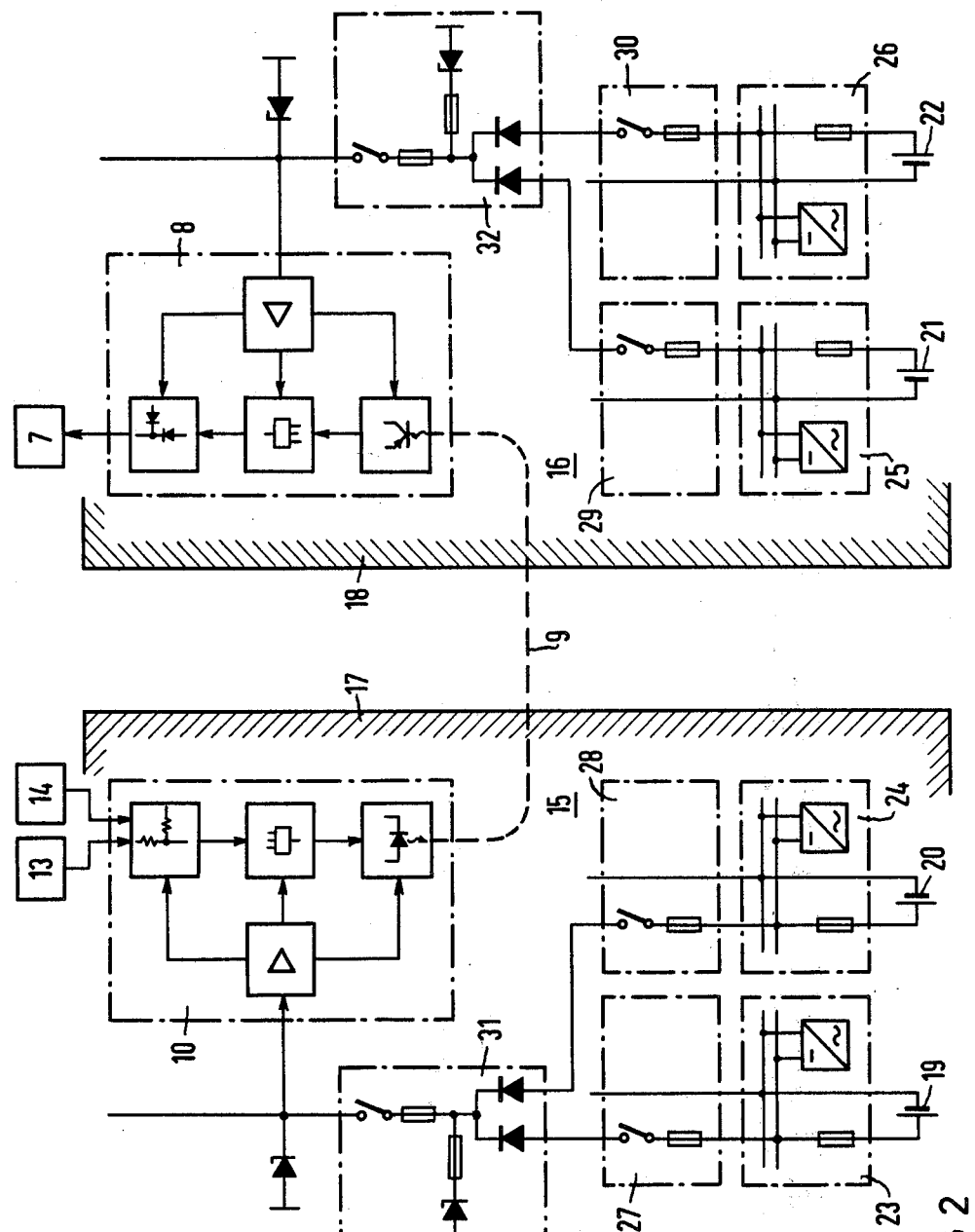

The construction and method of operation of the invention, however, together with additional objects and advantages thereof will be best understood from the following description of specific embodiments when read in connection with the accompanying drawings, in which:

FIG. 1 is a partially diagrammatic view and partially schematic block diagram of a control system for a safety-relevant valve of a nuclear power station; and FIG. 2 is another schematic diagram and diagrammatic view of two rooms of a power plant.

Referring now to the figures of the drawing and first particularly to FIG. 1 thereof, there is seen a block diagram of a system for the control of a safety-relevant valve 1 in a nuclear power station. The valve 1 is driven through a switching system 2 by a priority circuit 3. The priority circuit is connected through a system of lines 4 to a reactor protection system 5. The priority circuit 3, the reactor protection system 5 and the line system 4 are parts of safety-related control electronics 7 provided in the power station.

The priority circuit 3 is connected to an opto-electrical converter 8 through a further system of lines 6. Arriving light signals are converted in the converter 8 through an optically addressable transistor into electrical signals, and on the other hand, optical signals are generated by photo diodes according to electrical operating states. The converter 8 is connected through a light waveguide cable 9 to a correspondingly constructed electro-optical converter 10. The electrical part of the converter 10 is connected through line systems 11 and 12 to operational control electronics 13 constructed for manual operation or to operational control electronics 14 constructed for automatic control.

FIG. 2 shows that the operational control electronics 13, 14, respectively, are disposed in a room 15, while the safety-relevant control electronics 7 are located in a room 16 separated there-from by walls 17 and 18. The room 16 will preferably be constructed in nuclear reactor plants as a protected room, protected against earthquake influences and airplane crashes.

Both rooms 15, 16 have separate power supplies, each including two storage batteries 19, 20, 21 and 22, respectively, charging sets 23, 24 and 25, 26, respectively, connected thereto and switching systems 27, 28 and 29, 30. From the switching systems, the supply voltages from the individual storage batteries are fed into a combination circuit for the cabinet feed-circuit 31, 32, from where the converters 8, 10 as well as the safety-relevant and operational control electronics 7, 13 and 14 are supplied with electric power. There is no metallic connection between the power supply devices of both buildings. In addition, the remaining electric circuits disposed in the various buildings are also not electrically connected to each other. The only connection is formed by the optical or light wave guide cable 9 which is an electrical insulator and does not influence the electric circuits in one room, even in the event of very high overvoltages in the other room 15, 16 or when a fire breaks out.

The advantages achievable with the invention are in particular that through the optical wave guide cables 9, a metallic separation of the circuit elements from each other in the two rooms 15, 16 can be carried out up to the highest voltages; there is practically no longer an upper voltage limit. The transmission paths constructed by means of the optical wave guides can no longer be influenced electromagnetically; therefore disturbances are no longer picked up. The optical wave guide does not require consideration of the specific application and the other boundary conditions such as direction of the fault or maxima for occurring disturbances. The optical wave guide switching connections can be used for individual-conductor or multiplex transmission. It is therefore possible to transmit binary as well as analog signals with frequency modulation. The construction of so-called bus systems with optical wave guides is also possible. The two rooms 15, 16 each form electrical islands so-to-speak with a power supply of their own, space of their own and autarkic self-sufficient periphery. Contact of the circuit elements of one room 15 with those of the other room 16, and correspondingly also to other possibly provided circuit elements of further rooms, takes place only through the optical wave guides. This represents a completely new conductor technology concept.

What is claimed:

1. Control and monitoring devices for influencing safety-relevant system parts in a power station, comprising at least two rooms being separated from each othr, similar electric circuits disposed in each of said rooms for at least one of giving commands and receiving acknowledgements for influencing a system part, a similar, normally operational power supply being disposed in each of said rooms and being completely electrically separate from each other, electro-optical converters for transmitting signals being disposed in each of said rooms, and optical wave guide cables connecting said converters to each other.

2. Control and monitoring device according to claim 1, including means for protecting at least one of said rooms from earthquakes and crashing airplanes.

* * * * *